United States Patent [19]
Zocca et al.

[11] Patent Number: 6,098,883
[45] Date of Patent: Aug. 8, 2000

[54] METHOD OF ESTIMATING THE MID-POINTS OF BAR CODE ELEMENTS

[75] Inventors: Rinaldo Zocca, Bologna; Marco Bottazzi, Ferrara; Francesco Caselli, Bologna, all of Italy

[73] Assignee: Datalogic S.p.A., Italy

[21] Appl. No.: 09/205,397

[22] Filed: Dec. 4, 1998

[30] Foreign Application Priority Data

Dec. 5, 1997 [EP] European Pat. Off. .............. 97830653

[51] Int. Cl.$^7$ ...................................................... G06K 7/10
[52] U.S. Cl. ................................. 235/462.27; 235/462.25
[58] Field of Search ............................ 235/462.25, 462.27

[56] References Cited

U.S. PATENT DOCUMENTS 5,949,054  9/1999  Karden et al. ...................... 235/462.27

FOREIGN PATENT DOCUMENTS 0790572  8/1997  European Pat. Off. .
9714110  4/1997  WIPO .

OTHER PUBLICATIONS

European Search Report Apr. 6, 1998.

*Primary Examiner*—Harold I. Pitts
*Attorney, Agent, or Firm*—Hall, Priddy, Myers & Vande Sande

[57] ABSTRACT

A method of estimating the mid-points of elements of a bar code, wherein the code is illuminated, and the light diffused by the code is picked up to generate in response a signal having a substantially alternating waveform profile defined by high-amplitude zones alternating with low-amplitude zones; each high-amplitude zone corresponding to a space of the code, and each low-amplitude zone corresponding to a bar of the code. The signal is then quantized to obtain a discretized waveform having a number of local maximum and minimum points, and an observation window of a given width is defined by which to observe the waveform. The observation window is positioned on the maximum and minimum points of the discretized waveform to eliminate redundant maximum and minimum points within the observation window.

27 Claims, 9 Drawing Sheets

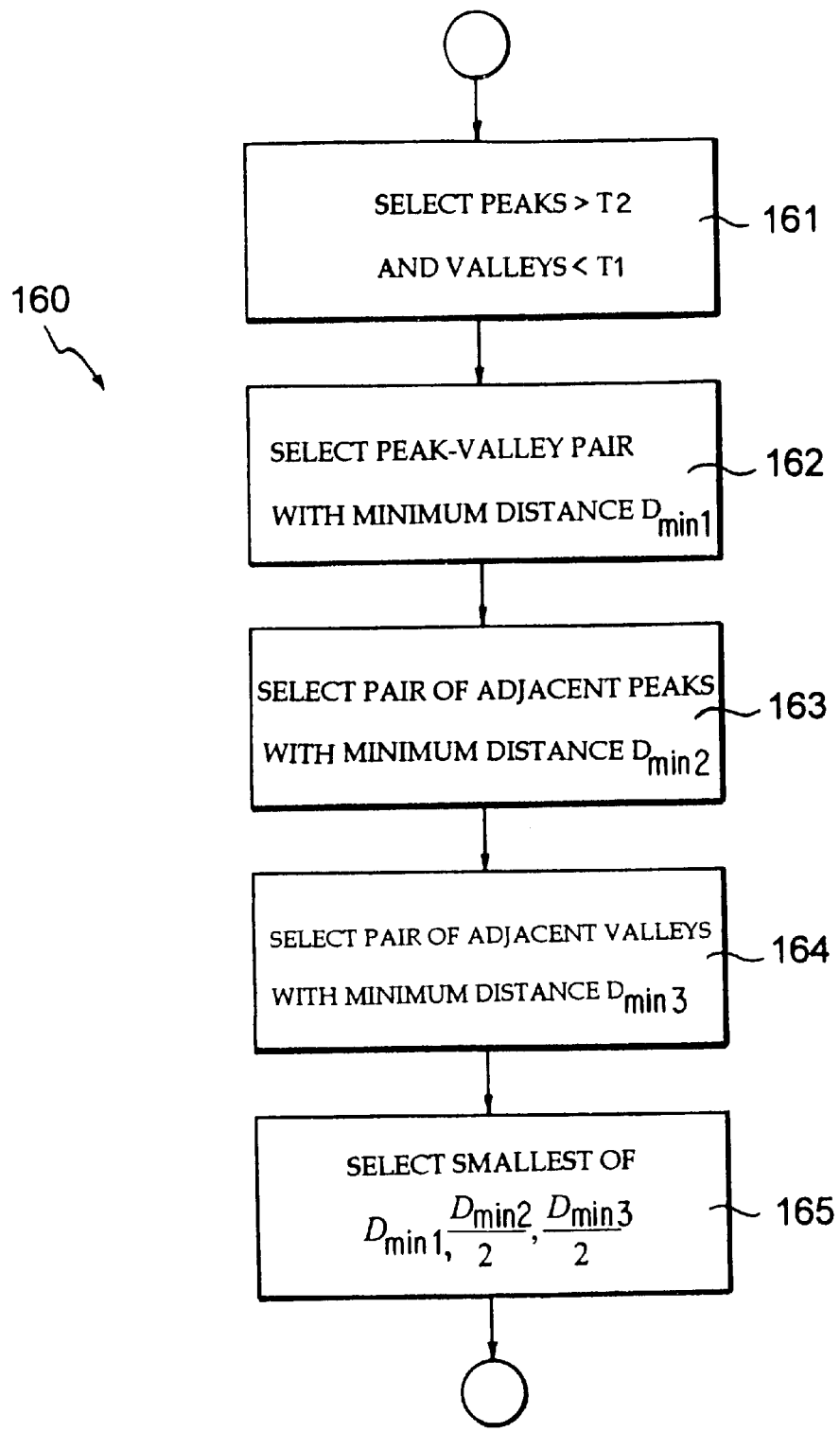

METHOD OF ESTIMATING THE MID-POINTS OF BAR CODE ELEMENTS

BACKGROUND OF THE INVENTION

The present invention relates to a method of estimating the mid-points of bar code elements.

As is known, bar codes (FIG. 3) are optical codes comprising a number of dark (normally black) rectangular elements (bars) separated by light (normally white) elements (spaces) and containing coded information. Each bar code symbol comprises a number of definite sequences—or so-called pattern—of bars and spaces composing the alphabet of the code, and the simplest symbols employ elements (bars and spaces) of two thicknesses, so that, for two-thickness codes, each pattern is normally defined by a combination of four different elements : narrow and wide bars, narrow and wide spaces. The narrowest element is normally referred to as the "unit element" or "module", which, in all commonly used symbols, is the same width for both bars and spaces.

One type of bar code reading device comprises a lighting device for directing a scanning beam onto the bar code; and a sensor receiving part of the light diffused by the support on which the bar code is impressed, and which, in response to the radiation impinging on it, generates an electric signal whose waveform is modulated by the alternating light/dark elements of the bar code. As is known, light is absorbed by the bars and reflected by the spaces, so that the signal assumes a high value at the spaces (on account of the high degree of radiation impinging on the sensor) and a low value at the bars (on account of the poor degree of radiation impinging on the sensor). The signal generated by the sensor is therefore an analog signal with a typical alternating pattern of peaks and valleys, each peak corresponding to a space, and each valley to a bar.

Another type of bar code reading device comprises a light source (e.g. a series of LEDs) for evenly illuminating the whole code; and a viewing sensor, in particular a linear sensor, for receiving the radiation diffused by the code. The linear sensor comprises successive elementary portions, which receive the radiation diffused by successive adjacent portions of the code, so that an alternating signal of the above type, modulated by the successive light and dark elements of the code, can be reconstructed by successively picking up the signals produced by the elementary portions of the sensor. Other reading devices comprise telecameras for picking up a two-dimensional grey-level image of the code, and supplying the image to electronic processing devices for extracting the above alternating signal from the two-dimensional image.

The region between a peak and the two adjacent valleys of the alternating signal represents the width of a space, and the region between a valley and the two adjacent peaks the width of a bar. FIG. 4 shows an ideal profile obtained reading a bar code in ideal conditions, with absolutely no noise or blurring.

Currently used readers employ a threshold to digitize the analog signal, i.e. to convert a signal of numerous values into an alternating signal comprising a high state corresponding to high reflectivity (above the threshold), and a low state corresponding to low reflectivity (below the threshold); and the alternating signal is subsequently processed to determine, in particular, maximum and minimum points of the signal corresponding to mid-points of the spaces and bars respectively, i.e. to the mid-points of the component elements of the bar code.

The waveform of the electric signal obtained using known reading devices is affected by numerous factors, including:

A) Waveform blurring B. This is defined mathematically as the relationship between the standard deviation std of the function describing the spatial energy dispersion of the laser beam (spot) illuminating the optical code, and the dimension W of the narrowest code element, that is:

$$B = std/W$$

Blurring therefore increases alongside an increase in the energy dispersion of the laser beam about a mean value, i.e. alongside enlargement of the laser beam spot, and alongside a reduction in the size of the bar code, and seriously affects the waveform of the alternating signal by lowering the peaks (FIG. 6) representing the narrowest spaces, and raising the valleys representing the narrowest bars of the code. Over and above a given blur value, even sequences of narrow elements between two wide elements are absorbed by the wide elements into a single edge, and odd sequences of narrow elements between two wide elements merge into a single element, thus preventing the alternating signal from being decoded correctly.

B) The electrooptical acquisition system. As is known, electrooptical acquisition systems act as "low-pass" filters, which tend to eliminate the higher space frequencies of the scanned bar code signal. As long as the space frequencies of the code correspond with the passband operating region of the electrooptical device, deformation of the signal is negligible and the resulting measurements therefore accurate. Conversely, when the reading device operates outside the passband (because the code is printed smaller or is not within the focus of the electrooptical acquisition device), deformation of the analog signal is no longer negligible, and such as to affect the reading process and possibly result in subsequent decoding errors.

C) Analog signal sampling frequency. Before being processed, the analog signal from the sensor must be sampled, i.e. converted into a sequence of numbers, and the resolution of reading devices featuring a photodiode is related to the sampling frequency of the analog signal. When the signal is high-resolution sampled, well in excess of the code dimensions, and in the absence of any other sources of error, the profile obtained by discretizing the analog waveform is a faithful image of the original, but is inaccurate when the sampling frequency is such as to prevent correct measurement of the narrower elements. As increasing the resolving power of the system invariably involves greater cost—more sensitive sensors, faster A/D converters, and more powerful computers with larger memories—processes capable of working to a precision greater than the resolution of the sampled signal (subpixel precision) are obviously preferable.

D) Analog signal quantization. The analog signal has an infinite number of possible values, as compared with a finite number of the sampled signal. The error introduced into the measuring process is known as the quantization error.

E) Ink-spread distortion. Very often, poor printing of the bar codes results in a systematic increase or reduction in the width of the bars with respect to the spaces (positive or negative ink spread).

F) Flaws in the code. Printing errors may result in the code elements (bars and spaces) differing widely from the nominal values, i.e. in the nominal relationships not being respected, and, when close to or above the maximum tolerance for a given system of symbols, such errors may result in improper decoding of the bar code.

G) Noise. This is a general term used to indicate both "electronic" noise in the electrooptical section, and environmental noise, e.g. fluctuations in lighting, both of which may more or less noticeably affect the waveform profile, as shown by the ideal profile in FIG. 4, and the real profile in FIG. 5 comprising spurious noise-induced peaks.

H) Nonuniform reflectivity profile. This type of flaw produces profiles affected by variations in the mean reflectivity value (higher peaks at the end of the code or vice versa), possibly caused by nonuniform lighting or by the acquisition method.

Moreover, known methods of determining the code element (space and bar) arrangement provide for locating the wavefronts of the signal, which, for the reasons listed above, fails to provide for determining the code element arrangement accurately.

SUMMARY OF THE INVENTION

It is an object of the present invention to provide a method of estimating the mid-points of code elements (spaces and bars), designed to eliminate the aforementioned drawbacks.

According to the present invention, there is provided a method of estimating the mid-points of elements of a bar code, wherein said code is illuminated, and the light diffused by said code is picked up to generate in response a signal having a substantially alternating waveform profile comprising high-amplitude zones alternating with low-amplitude zones; each high-amplitude zone corresponding to a space of the code, and each low-amplitude zone corresponding to a bar of the code; characterized by comprising the steps of: sampling said signal to obtain a discretized waveform having a number of local maximum and minimum points; defining an observation window of a given width, by which to observe said discretized waveform; and positioning said observation window on said local maximum and minimum points of said discretized waveform to eliminate redundant maximum and minimum points.

The method preferably also comprises the steps of: defining threshold values and applying said threshold values to said discretized waveform to divide the space in which the waveform lies into a number of regions; and assigning each of said regions a set of specific rules by which to eliminate said redundant points. The observation window is also positioned on a specimen maximum or minimum point, which is compared with all the other discretized waveform points within the observation window.

BRIEF DESCRIPTION OF THE DRAWINGS

A non-limiting embodiment of the present invention will be described by way of example with reference to the accompanying drawings, in which:

FIGS. 2b, 2c, 2d, 2e, 2f show detailed block diagrams of a number of blocks in the FIG. 2a diagram;

DETAILED DESCRIPTION OF THE INVENTION

Figure 1:
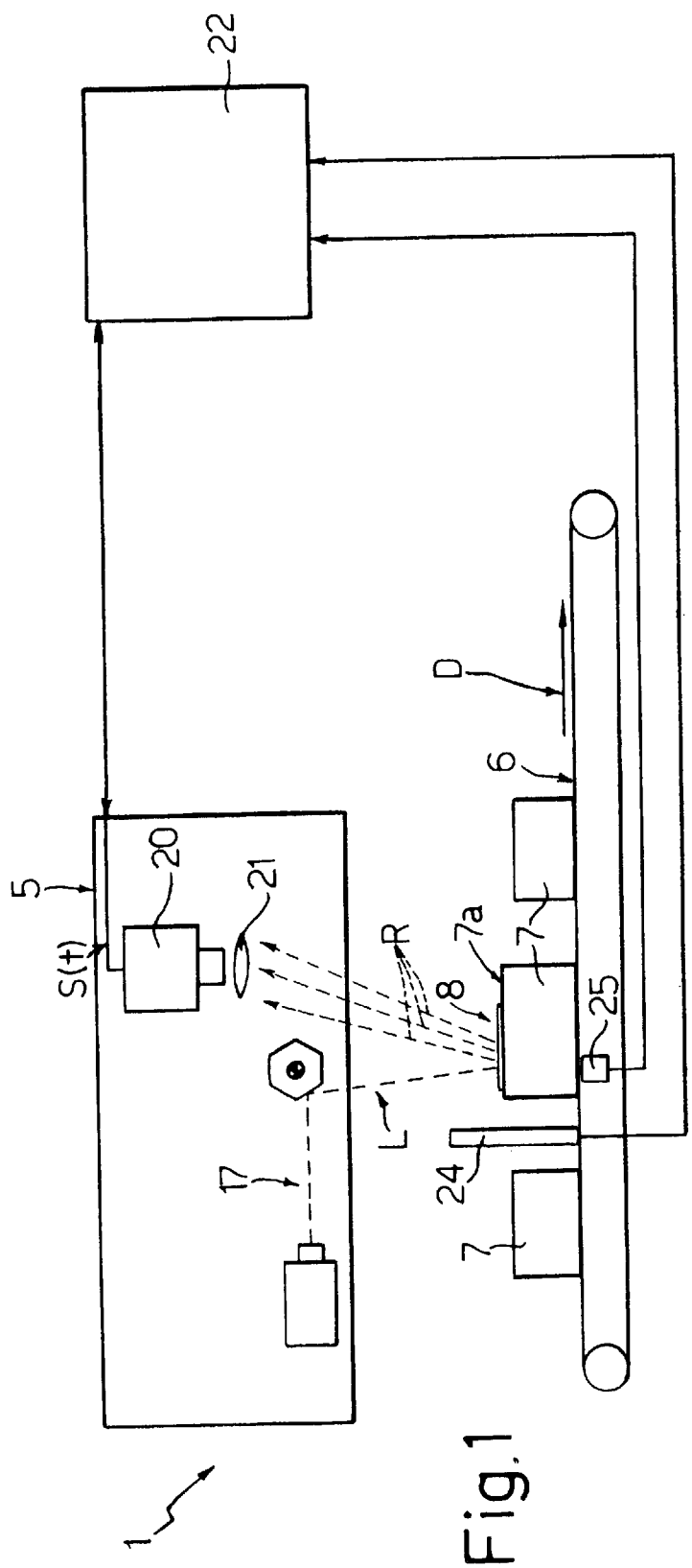
FIG. 1 shows, schematically, a device for reading optical codes, in particular bar codes, and implementing the method according to the present invention.
Figure 3:
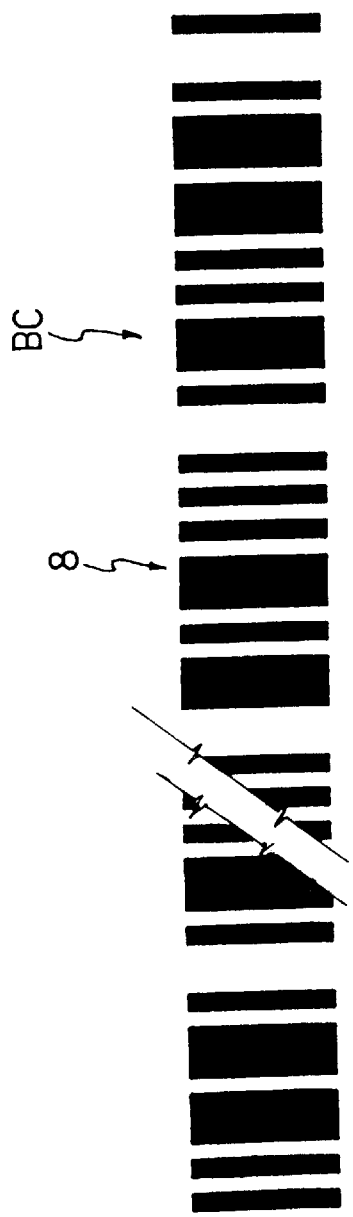
FIG. 3 shows a bar code.

Number 1 in FIG. 1 indicates as a whole a reading device comprising a read head 5 facing a conveyor belt 6 and for scanning objects 7 lying on conveyor belt 6 and traveling in a straight horizontal direction D. On face 7a facing read head 5, each object 7 comprises an optical code 8, in particular a known bar code BC (FIG. 3) comprising a number of dark (normally black) rectangular elements (bars) separated by light (normally white) rectangular elements (spaces), and the rectangular elements of which (light/dark) may be of different widths.

Read head 5 comprises a known lighting device 17 for directing a laser beam L onto optical code 8 to scan the code; and a sensor 20 (e.g. a photodiode) associated with an optical acquisition and focusing system 21 (shown schematically), and which receives the light R diffused by optical code 8, and generates an analog signal S(t) of an intensity proportional to the brightness of the currently scanned portion of optical code 8. Analog signal S(t) is supplied to an electronic unit 22, which, among other things, takes into account the movement of conveyor belt 6, and receives signals generated by a sensor 24 located along conveyor belt 6 to determine the height of objects 7 traveling along the belt. Unit 22 also cooperates with a sensor 25 for detecting the presence of objects 7 in the vicinity of read head 5.

The reading device may obviously be other than as shown, for example a portable type comprising a hand-hold casing (not shown) housing a light source (e.g. a series of LEDs) for evenly lighting the whole bar code, and a viewing sensor, in particular a known linear sensor (not shown), for receiving the light diffused by the code. The linear sensor comprises successive elementary portions for receiving the light diffused by adjacent successive portions of the bar code, and the reading device comprises a microprocessor control device (not shown), which successively receives the signals produced by the elementary portions of the sensor to reconstruct an alternating signal of the type described, modulated by the succession of light and dark portions of the code.

The reading device may also comprise a telecamera for picking up a two-dimensional grey-level image of the code; and an electronic processing device for receiving the signal generated by the telecamera and extracting the alternating signal in known manner from the two-dimensional image.

Figure 2A:
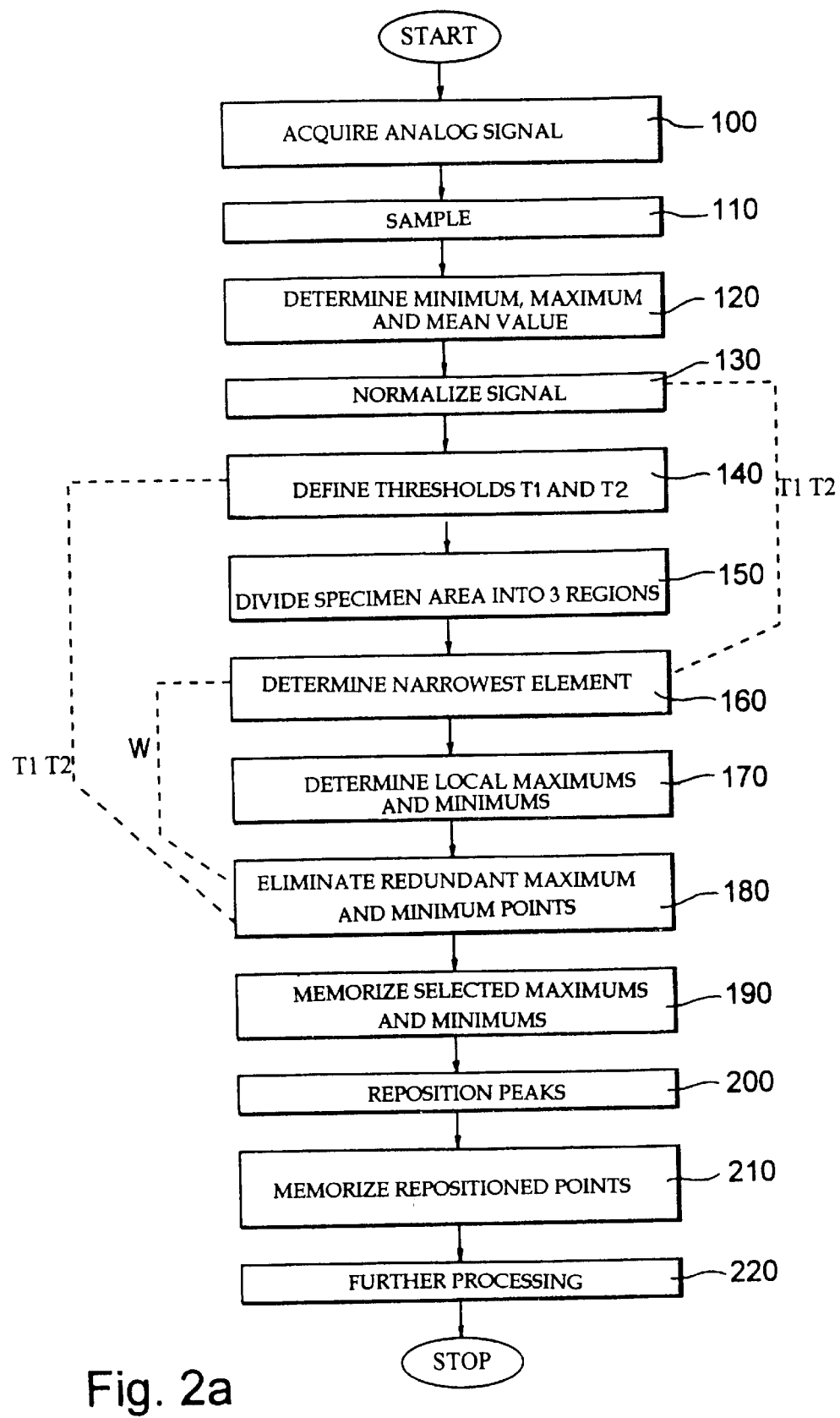
FIG. 2a shows a logic block diagram of a sequence of steps in the method according to the present invention.

FIG. 2a shows a block diagram of the operating cycle of electronic processing unit 22.

With reference to FIG. 2a, a START block goes on to a block 100, which acquires the analog signal S(t) generated by sensor 20.

Figure 4:
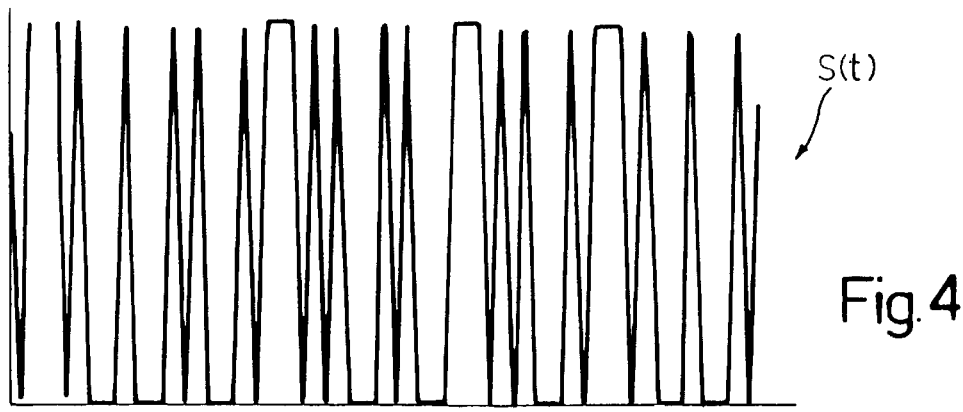
FIG. 4 shows a time graph of an ideal bar code reading signal.
Figure 5:
FIG. 5 shows a time graph of a real bar code reading signal.

The analog signal S(t) typically comprises a substantially alternating waveform profile (FIG. 4) defined by high-amplitude zones (peaks) alternating with low-amplitude zones (valleys). Light is reflected by the spaces of the bar code, so that a high brightness level impinges on sensor 20 to produce a high value of signal S(t), and is absorbed by the bars of the code so that a low brightness level impinges on sensor 20 to produce a low value of signal S(t). In the waveform of signal S(t), a peak therefore represents a space; a valley represents a bar; the region centered about a peak is defined by two adjacent valleys and represents the width of a space; and the region centered about a valley is located between two adjacent peaks and represents the width of a bar. FIG. 4 shows an ideal profile obtained by scanning a bar code in ideal conditions, with absolutely no noise and with the code located at the focal point of optical acquisition system 21 associated with sensor 20. In real conditions, however, in which the signal is subjected to a certain amount of blurring B, e.g. when the code is located in a region not coincident with the focal point of optical acquisition system 21, the waveform is deformed (FIG. 6) by blurring B lowering the peaks $P_s$ representing the narrowest spaces, and raising the valleys $V_s$ representing the narrowest bars of code 8.

Block 100 is followed by a block 110, which performs an analog to digital (A/D) conversion of the analog signal S(t) to generate a discretized signal Sd(t), i.e. a series of discrete values representing a number of points of the analog signal. A/D conversion of a time-variable analog signal is well known and therefore not described in detail.

Block 110 is followed by a block 120, which extracts (in known manner) from discretized signal Sd(t) the maximum value Vmax, the minimum value Vmin, and the mean value Vmed, which are memorized and made available for subsequent processing.

Block 120 is followed by a block 130, which, according to the data extracted in block 120, performs a known normalization of discretized signal Sd(t), whereby a conventional unit value ("1") is substituted for the maximum value Vmax of signal Sd(t), and a zero value ("0") is substituted for the minimum value. The values of signal Sd(t) between the maximum and minimum are made continuously variable between one and zero. Though conveniently included to simplify subsequent processing, the normalization performed in block 130 is not essential for performing the rest of the method described, so that the method according to the present invention need not necessarily comprise block 130.

Block 130 is followed by a block 140 (described in detail later on), which calculates or selects two thresholds $T_1$, $T_2$ subsequently used to define three regions in which to classify the various points of normalized signal Sd(t).

More specifically, the waveform of normalized signal Sd(t) may be represented in a Cartesian space (FIG. 7) in which the X axis indicates successive scanning times (and therefore different zones of the bar code); the Y axis indicates increasing signal amplitude values (and therefore increasing brightness values); threshold $T_1$ is indicated by a first horizontal line parallel to and separated from the X axis by a distance equal to $T_1$; and threshold $T_2$ is indicated by a second horizontal line parallel to and separated from the X axis by a distance equal to $T_2$. By means of a block 150 downstream from block 140, thresholds $T_1$ and $T_2$ define, in the above Cartesian space, three adjacent regions, namely:

a first region $R_1$—hereinafter referred to as the black region—extending between the X axis and first horizontal line $T_1$, and comprising all the values P(x,y) of normalized signal Sd(t) of an amplitude ranging between zero and threshold $T_1$;

a second region $R_2$—hereinafter referred to as the grey region—extending between first horizontal line $T_1$ and second horizontal line $T_2$, and comprising all the values P(x,y) of normalized signal Sd(t) of an amplitude ranging between thresholds $T_1$ and $T_2$; and a third region $R_3$—hereinafter referred to as the white region—extending between second horizontal line $T_2$ and the maximum unit value of the normalized signal, and comprising all the P(x,y) values of normalized signal Sd(t) of an amplitude above threshold $T_2$.

Figure 7:
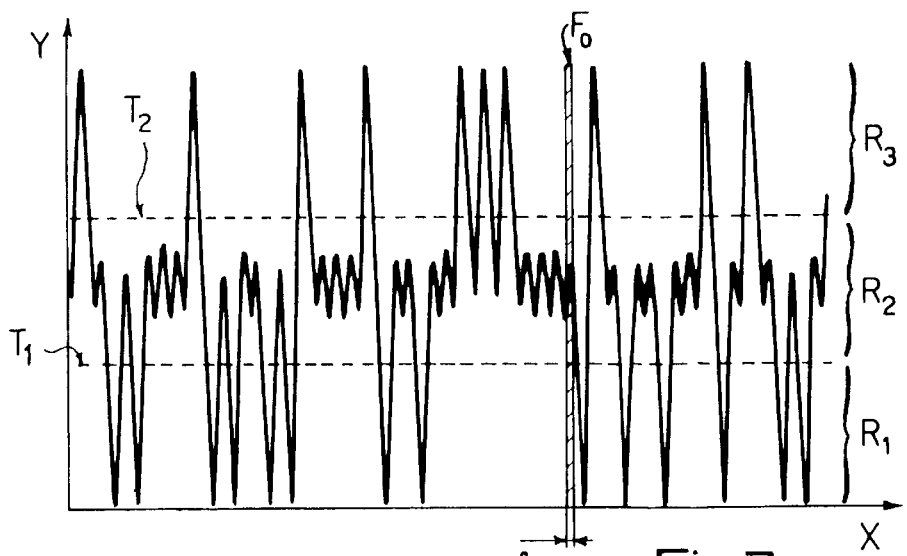
FIG. 7 shows a further step in the method according to the present invention.

As stated, blurring B lowers the peaks corresponding to the narrowest spaces, and raises the valleys corresponding to the narrowest bars. With reference to FIG. 7 relative to an out-of-focus code, it is assumed that white region $R_3$ can contain no valleys representing the center of a dark bar, black region $R_1$ can contain no peaks representing the center of a space, whereas grey region $R_2$ may contain both. In other words, threshold $T_1$ is defined as the minimum reflectivity value that the signal may assume in the presence of a light bar, and threshold $T_2$ the maximum reflectivity value that the signal may assume in the presence of a dark bar.

Block 150 is followed by a block 160 (described in detail later on), which provides for determining the width W ("module") of the narrowest element (bar or space) of bar code 8.

Block 160 is followed by a block 170 (described in detail later on), which provides for determining the local maximum and minimum points of normalized signal Sd(t). The local maximum points PM(x,y) are determined by selecting the points surrounded by first and second points of an amplitude lower than that of the selected point (or equal to that of the previous point, but greater than that of the adjacent point); and the local minimum points Pm(x,y) are determined by selecting the points surrounded by first and second points of an amplitude greater than that of the selected point (or equal to that of the previous point, but lower than that of the adjacent point). The procedures for selecting local maximum and minimum points of a discretized waveform are well known and therefore not described in detail.

Block 170 is followed by a block 180 (described in detail later on), which, from all the local maximum and minimum points determined in block 170, selects a subset of absolute maximum and minimum points by eliminating a number of nonsignificant (redundant) local maximum and minimum points mainly present due to noise.

In the absence of noise, or if blurring is such as not to eliminate any narrow elements (bars or spaces), each local maximum or minimum point of the signal represents the center of a code element. Due to the noise in real signals, however, the number of maximum and minimum points in the signal is greater than the number of code elements; the number of nonsignificant (i.e. noise-induced) maximum and minimum points depends on noise frequency, resolution of the code, and signal sampling frequency; and the amplitude of the noise peaks depends on the power of the noise.

According to the present invention, a waveform observation window of a given width is defined and positioned on the local maximum and minimum points of the discretized waveform to eliminate the redundant maximum and minimum points inside the window; and a number of rules (described later on) are developed by which to eliminate the nonsignificant points and preserve only the peaks and valleys corresponding to the code elements (bars and spaces); said rules being selected according to the region $R_1$, $R_2$, $R_3$ (black, grey, white) in which the points lie; and some of the rules being executed using the information processed in block 160 (width W of the narrowest code element).

Block 180 is followed by a block 190 in which the local maximum and minimum points selected in block 180 are memorized.

Block 190 is followed by a block 200 (described in detail later on), which, as the position of the peak points preserved and memorized in block 190 may not be the best, provides for repositioning the local maximum and minimum points memorized in block 190.

Block 200 is followed by a block 210, which provides for memorizing the local maximum and minimum points repositioned in block 200, to generate a number of maximum points corresponding to the mid-points of the spaces, and a number of minimum points corresponding to the mid-points of the bars.

Block 210 is followed by a block 220, which represents schematically a series of further known operations using the information relative to the position of the mid-points of the code elements (spaces and bars).

Figure 2B:
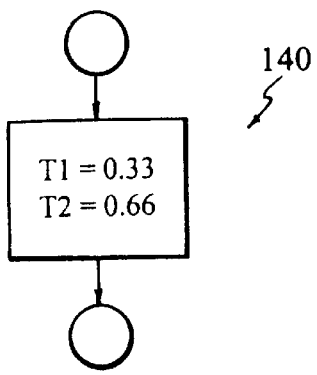
Figure 2C:
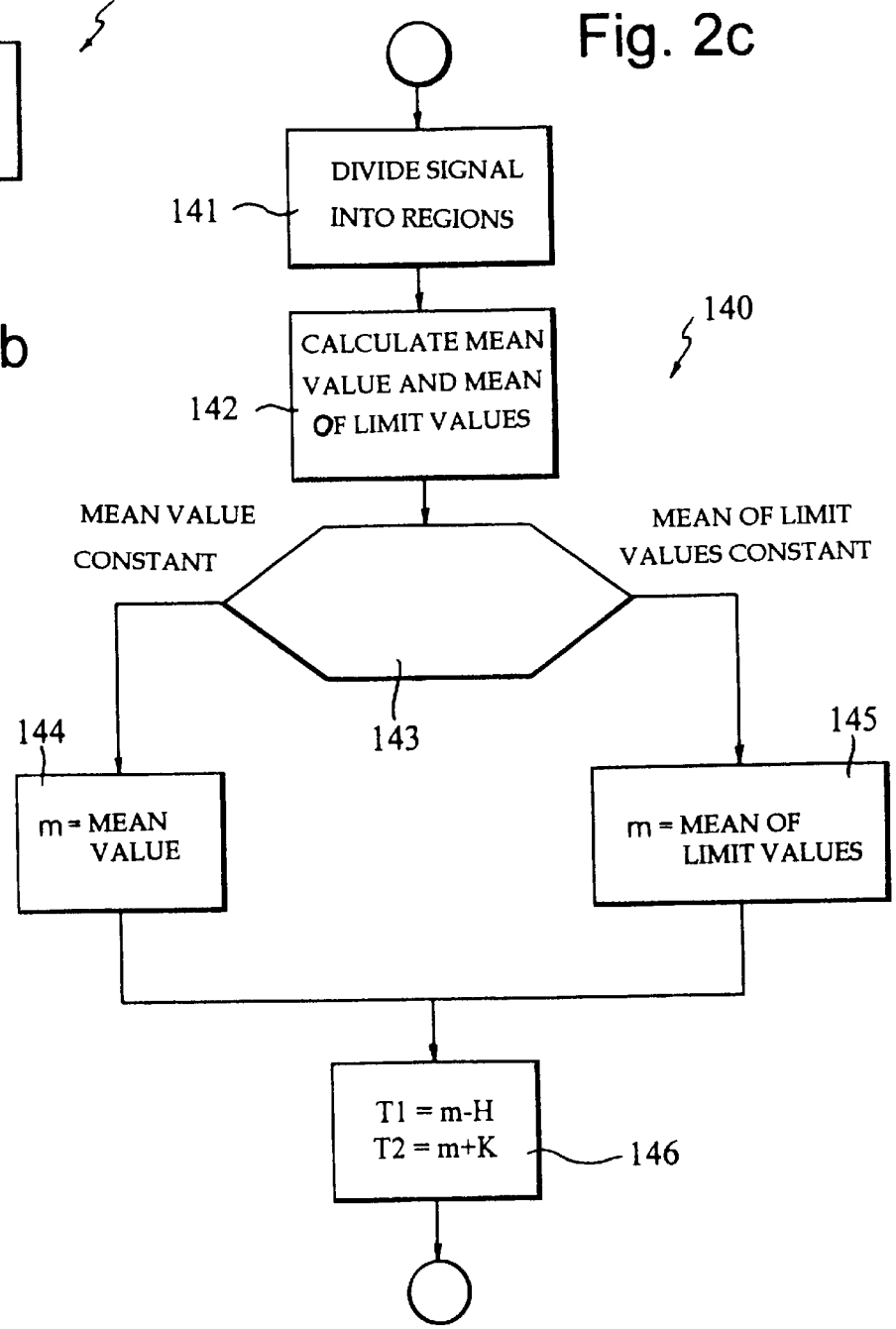

FIGS. 2b and 2c show in more detail the operations performed in block 140 to define thresholds $T_1$ and $T_2$.

According to a first embodiment of block 140 (FIG. 2b), thresholds $T_1$ and $T_2$ are defined by assigning each a previously processed fixed value, i.e.

$T_1$=first numeric value $T_2$=second numeric value

More specifically, thresholds $T_1$ and $T_2$ may conveniently be processed by establishing a maximum permissible blur B value (e.g. B less than 0.9), and by observing that, with this maximum blur B value (and in the absence of noise), the peaks representing the center of the light bars never assume a value below a first numeric value (e.g. 0.33) assumed as a first threshold, and the valleys representing the center of the dark bars never assume a value above a second numeric value (e.g. 0.66) assumed as a second threshold. In the example shown, and with reference to normalized signal Sd(t), threshold $T_1$ is tied to value 0.33 (i.e. to 33% of the maximum value of normalized signal Sd(t)), and threshold $T_2$ to value 0.66 (i.e. to 66% of the maximum value of normalized signal Sd(t)), so that, even in the complete absence of noise, the method described and employing thresholds $T_1$ and $T_2$ is incapable of operating with blur values above the maximum B value of 0.9.

Thresholds $T_1$ and $T_2$ may of course be assigned different values. If thresholds $T_1$ and $T_2$ are modified to increase grey region $R_2$, the method according to the present invention is more accurate but not so capable of operating on blurred waveforms; whereas, if thresholds $T_1$ and $T_2$ are modified to reduce grey region $R_2$, the method is potentially capable of operating on waveforms with a higher degree of blurring, but is less accurate. The choice of thresholds $T_1$ and $T_2$ therefore involves a tradeoff between the above two conflicting requirements.

By way of an alternative (i.e. to fixed unchanging thresholds), block 140 may define variable thresholds $T_1$, $T_2$ adaptable to the characteristics of signal Sd(t) or to the outcome of the previous processing operation, in which case, block 140 comprises a first block 141 (FIG. 2c) for dividing the waveform of discretized, normalized signal Sd(t) into a predetermined number of adjacent regions of the same size, and each large enough to supply statistics that, in normal conditions, do not differ from those calculated relative to signal Sd(t) as a whole.

Block 141 is followed by a block 142, which, for each region defined in block 141, calculates the mean value and the mean of the limit values of the signal in that region.

Block 142 is followed by a block 143, which goes on to a block 144 in the event the mean value remains substantially constant (stationary) in the various regions, and which goes on to a block 145 in the event the mean of the limit values remains substantially constant (stationary) in the various regions.

In this connection, it should be pointed out that, in the presence of a reflection, the mean value calculated region by region remains more or less constant, whereas the mean of the limit values differs noticeably in the region in which the reflection is present. In the presence of a stain or abrasion, on the other hand, the mean of the limit values calculated region by region remains more or less constant, whereas the mean value differs noticeably in the region containing the flaw.

If the mean value remains substantially constant, block 144 uses this (previously calculated) mean value to calculate thresholds $T_1$, $T_2$ (block 146 downstream from block 144) according to the equations:

$T_1 = m-H$ $T_2 = m+K$ where H and K are two not necessarily different constants capable of assuming values of 0 to 0.5, and m represents the previously calculated mean value.

If the mean of the limit values remains substantially constant, block 145 uses this (previously calculated) mean to calculate thresholds $T_1$, $T_2$ (block 146 downstream from block 145) according to the equations:

$T_1 = m-H$ $T_2 = m+K$ where H and K are two not necessarily different constants capable of assuming values of 0 to 0.5, and m represents the previously calculated mean of the limit values.

FIG. 2d shows in more detail the operations performed in block 160 to determine the width of the narrowest bar code element ("module") by means of a straightforward analysis of the discretized signal Sd(t) waveform.

Block 160 comprises a block 161, which provides for selecting, from the discretized, normalized signal Sd(t) waveform, the peaks of a value above second threshold $T_2$, and the valleys of a value below first threshold $T_1$, to obtain a subset of peaks and valleys.

Figure 6:
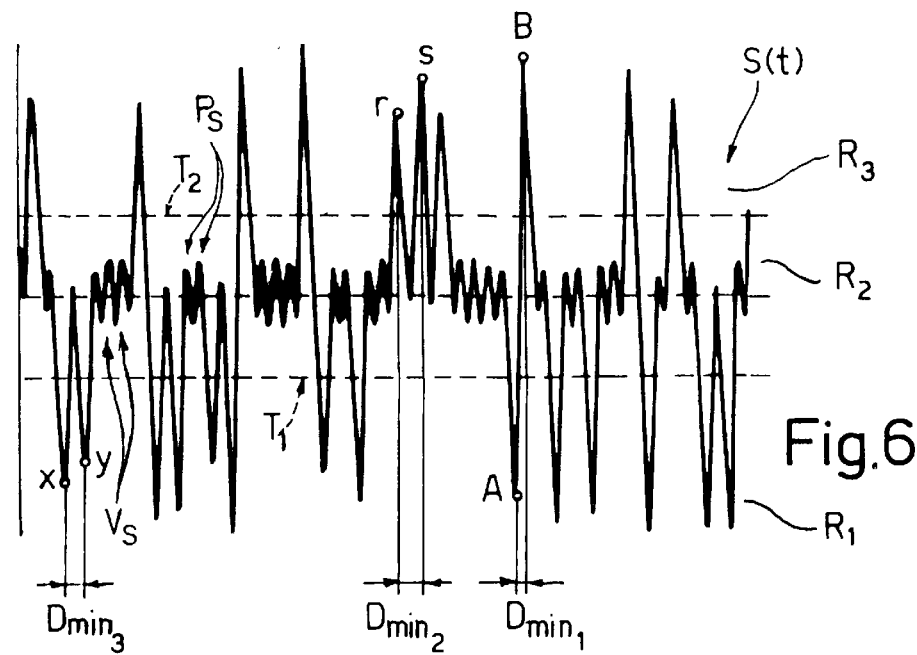
FIG. 6 shows one step in the method according to the present invention.

Block 161 is followed by a block 162, which selects from the subset defined in block 161 the peak-valley pair separated by the smallest distance $D_{min1}$ measured along the X axis and expressed in number of pixels. In FIG. 6, distance $D_{min1}$ is that between valley A and peak B.

If the waveform is out of focus, as in FIG. 6, the elements (bars and spaces) represented by A and B are definitely not narrow, in that narrow elements generate low peaks and shallow valleys. If there is at least one sequence of two adjacent non-narrow elements, e.g. two-modules wide, the distance between points A and B equals two modules minus the positioning error of the peaks. As bar code symbol systems exist in which a two-two sequence may not exist within the code, further operations are performed.

That is, block 162 is followed by a block 163, which determines half the minimum distance $D_{min2}$ between two adjacent peaks, both in white region $R_3$ (i.e. peaks of an amplitude ranging between threshold $T_2$ and the maximum unit value of the normalized signal). In FIG. 6, distance $D_{min2}$ is that between peaks r and s.

Block 163 is followed by a block 164, which determines half the minimum distance $D_{min3}$ between two adjacent valleys, both in black region $R_1$ (i.e. valleys of an amplitude ranging between zero and threshold $T_1$). In FIG. 6, distance $D_{min3}$ is that between valleys x and y.

Block 164 is followed by a block 165, which selects the smallest of distances $D_{min1}$, $D_{min2}$, $D_{min3}$ determined in respective blocks 162, 163, 164; which smallest value is most likely equal to roughly one, one and a half times the width W of the narrowest code element ("module"), and is selected as the width W of the narrowest code element in block 165.

Figure 2E:
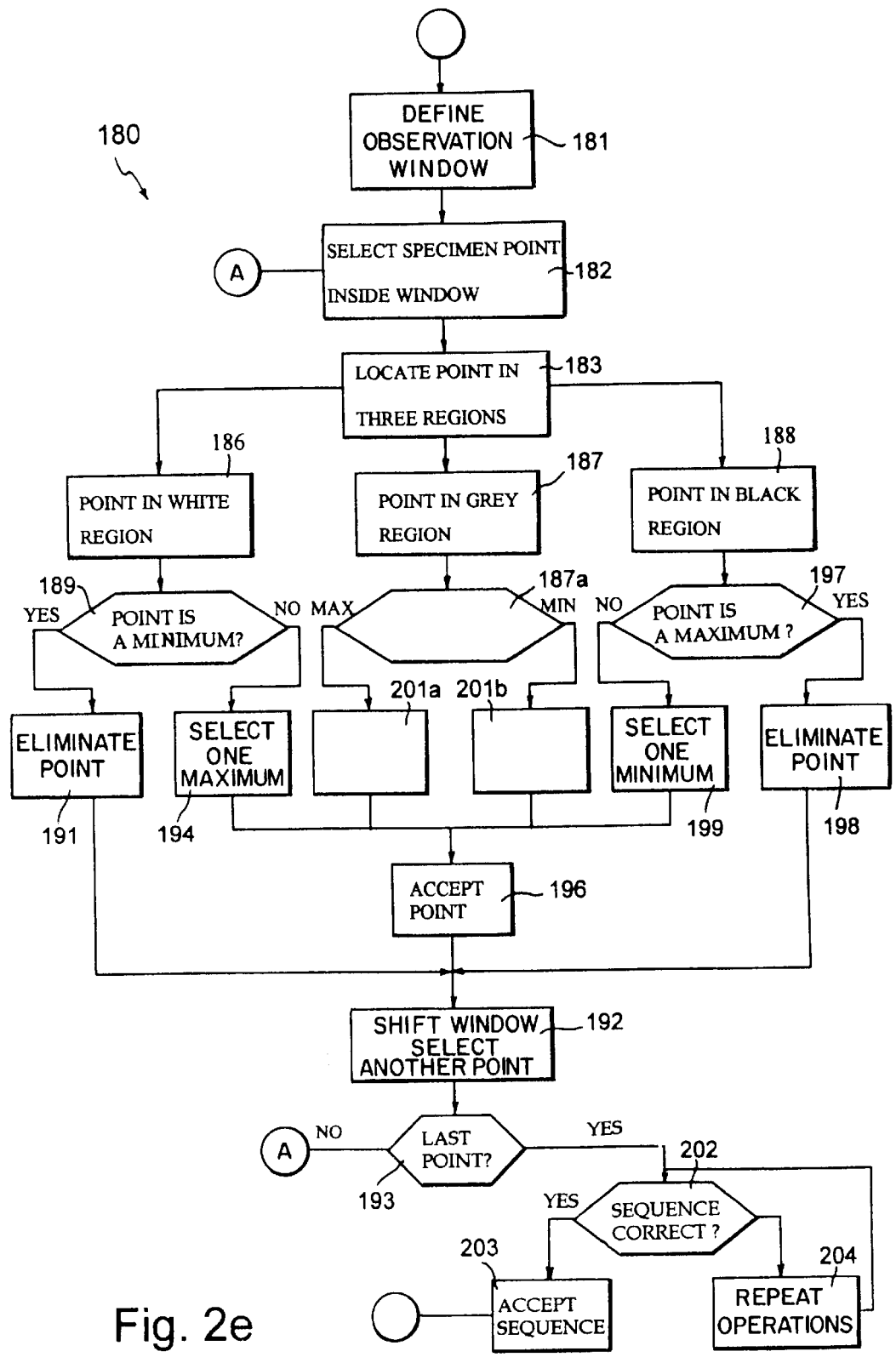

FIG. 2e shows in more detail the operations performed in block 180 to eliminate the redundant local maximum and minimum points.

Block 180 comprises a first block 181, which defines an observation window $F_0$ of a width A equal to or greater than width W of the narrowest code element, and preferably from one to two modules wide.

In the Cartesian representation of the signal (as in FIG. 7, for example), observation window $F_0$ is definable as the area within a rectangular perimeter with the longer sides parallel to the Y axis, the shorter sides parallel to the X axis, and of a width A, measured along the X axis, equal to or greater than width W.

Block 181 is followed by a block 182, which selects a first specimen local maximum or minimum point P(x,y) of the normalized, discretized signal Sd(t) waveform (local maximum and minimum points P(x,y) are determined beforehand in block 170).

Figure 8A:
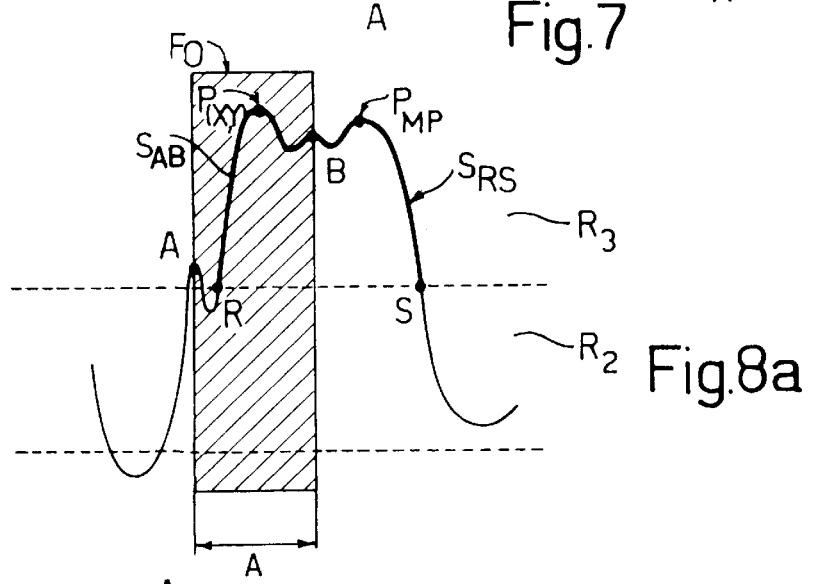
FIGS. 8a, 8b, 8c show further details of operations in the FIG. 7 step.
Figure 8B:
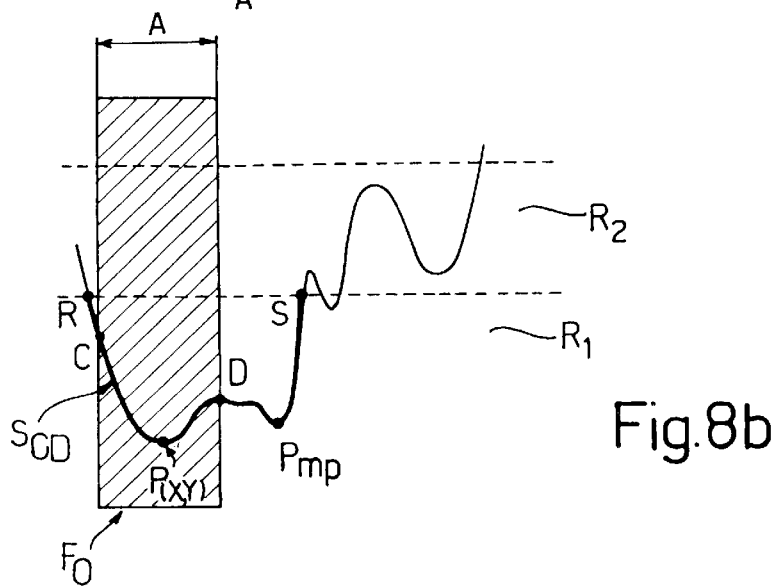
Figure 8C:
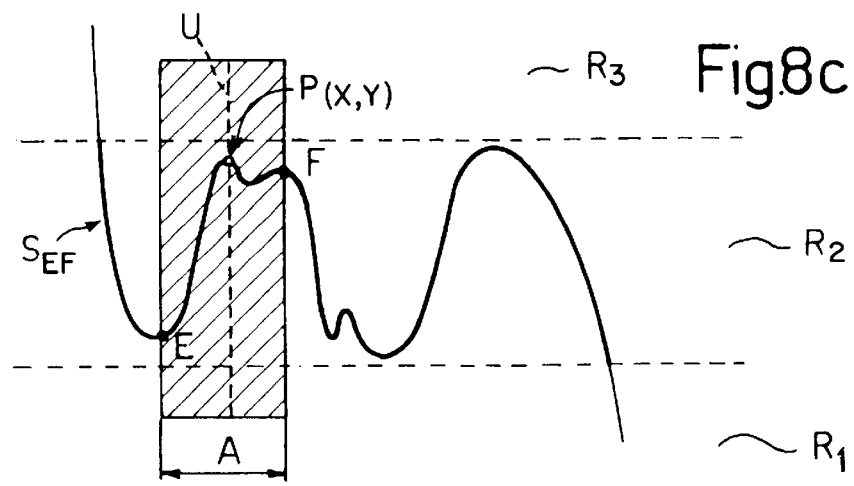

The specimen local maximum or minimum point P(x,y) is selected by centering observation window $F_0$ on the specimen point P(x,y) (as shown in FIG. 8c, for example) so that the vertical axis of symmetry U of the window (parallel to the Y axis and separated from the longer sides of the window by a distance A/2) extends through the specimen point P(x,y).

Examination of the local maximum or minimum point P(x,y) is intended to mean a comparison of the point with all the other discretized signal Sd(t) waveform points within observation window $F_0$. For the sake of simplicity, as the method henceforth operates solely on local maximum or minimum points P(x,y) these will be referred to hereinafter simply as points P(x,y).

Block 182 is followed by a block 183, which locates the selected point P(x,Y) within the three regions defined by block 150.

More specifically, block 183 selects:
- a block 186 in the event point P(x,y) is located in white region $R_3$, i.e. is of an amplitude (measured along the Y axis) above threshold $T_2$;
- a block 187 in the event point P(x,y) is located in grey region $R_2$, i.e. is of an amplitude (measured along the Y axis) ranging between thresholds $T_1$ and $T_2$; and
- a block 188 in the event point P(x,y) is located in black region $R_1$, i.e. is of an amplitude (measured along the Y axis) below threshold $T_1$.

Block 186, selected in the event point P(x,y) is located in the white region, is followed by a block 189, which determines whether point P(x,y) within window $F_0$ is a minimum point. If so, block 189 goes on to a block 191, which eliminates point P(x,y) as unacceptable. Normally, only a remote possibility exists of finding an acceptable minimum point (i.e. relative to a bar) in the white region, which typically comprises signal peaks, i.e. maximum points. Block 191 is followed by a block 192, which shifts observation window $F_0$ to select a further specimen point, and then goes on to a block 193, which determines whether all the maximum and minimum points have been examined, and goes back to block 182 if there are any more points P(x,y) to be selected.

If the specimen point P(x,y) is a maximum, block 189 goes on to a block 194, which is followed by a block 196, which accepts the point and then goes on to block 192.

More specifically, blocks 194, 192 and 196 provide for:

- selecting the specimen point P(x,y) (block 194) if it is the absolute maximum within the observation window, and ignoring the specimen point P(x,y) if the window contains at least one point of a higher amplitude;
- shifting and positioning the window (block 192) on a further selected maximum point (if any) within the white region;
- selecting the further specimen point (block 194) if it is the absolute maximum within the observation window, and ignoring the further specimen point if the window contains at least one point of a higher amplitude;
- repeating the point selection and window shift steps for a number of consecutive maximum points along a continuous waveform portion $S_{RS}$ in the white region, and preserving the last selected maximum point, which is accepted and memorized (block 196).

The above operations therefore provide for selecting a single maximum point, typically the last detected maximum point, along continuous portion $S_{RS}$.

FIG. 8a shows more clearly the analysis of point P(x,y) performed by blocks 194, 192, 196. As can be seen, the observation window $F_0$ centered on point P(x,y) contains a discretized signal Sd(t) waveform portion $S_{AB}$ located in white region $R_3$; and the specimen point P(x,y), being the absolute maximum of the local maximum and minimum points along portion $S_{AB}$, is therefore selected. Window $F_0$ is then shifted onto point B, which, not being the absolute maximum, is rejected, and then onto point $P_{MP}$, which, being the absolute maximum within window $F_0$, is also selected. Along the discretized signal Sd(t) waveform portion $S_{RS}$ between points R and S in region $R_3$ (FIG. 8a), both points P(x,y) and $P_{MP}$ would therefore be preserved, by both being the absolute maximum within the respective observation windows. However, as the discretized signal Sd(t) waveform portion between R and S represents only one space and must therefore comprise only one absolute maximum point, block 194 selects only one, in particular the last, of the absolute maximums determined by observation window $F_0$, in this case point $P_{MP}$. Other absolute maximum points may of course be selected, or a "mean" of the selected absolute maximum points, e.g. an arithmetic mean of the X axis values of the selected maximums, may be calculated.

The preserved absolute maximum point $P_{MP}$ is memorized in block 196.

Figure 10:
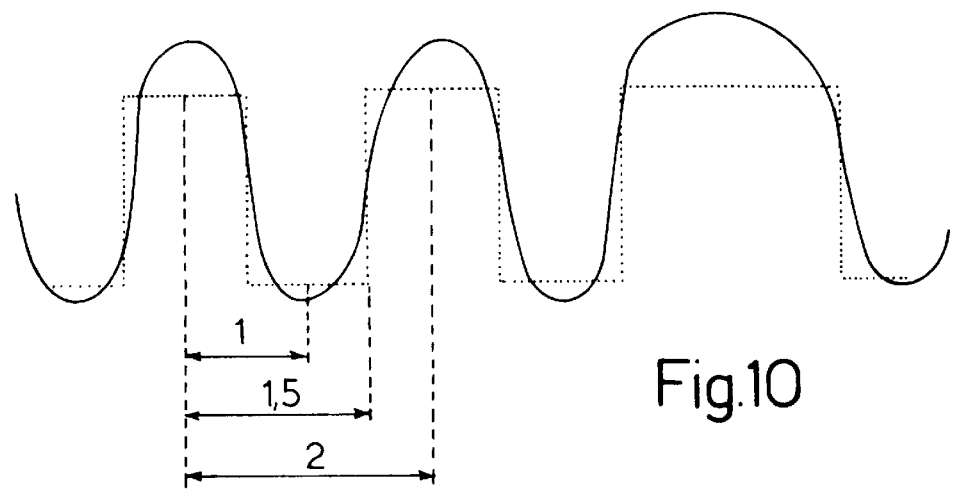
FIG. 10 shows a further step in the method according to the present invention.

The operations performed in blocks 189 and 194 are shown more clearly in FIG. 10, which shows a waveform with substantially no noise, and only affected by blurring of such an intensity as to affect the shape of the wavefronts, but not such as to noticeably shift the peaks and valleys from their nominal positions; in which case, each local maximum represents the center of a space, and each local minimum the center of a dark bar. The presence of noise, on the other hand, produces spurious peaks, and the real peaks are shifted from their nominal positions. Assuming an observation window $F_0$ of width A, centered each time on a different point, is moved along the sequence of local maximum and minimum points, and all the maximum (or minimum) points that are not the absolute maximum (or minimum) assumed by the waveform within the window are eliminated: if A is less than two modules, it is more likely that, in the presence of noise, not all the noise peaks are eliminated; whereas, if A is equal to or greater than two modules, peaks relative to narrow bars or spaces are more likely to be eliminated in the presence of distortion. In this connection, it should be pointed out that observation window $F_0$ for enclosing a subportion of the discretized signal Sd(t) waveform is movable along a first reference axis (X axis) perpendicular to the axis (Y axis) along which regions $R_1$, $R_2$, $R_3$ are defined.

Block 188, selected in the event point P(x,y) is located in black region R$_1$, is followed by a block 197, which determines whether point P(x,y) within window F$_0$ is a maximum point. If specimen point P(x,y) in block 197 is a relative maximum point, block 197 goes on to a block 198, which eliminates point P(x,y) as unacceptable. Normally, only a remote possibility exists of finding an acceptable maximum point (i.e. relative to a space) in black region R$_1$, which typically comprises signal valleys, i.e. minimum points.

In the event the specimen point P(x,y) is a minimum, block 197 goes on to a block 199, which is followed by blocks 196 and 192.

More specifically, blocks 199, 196 and 192 provide for:
selecting the specimen point P(x,y) (block 199) if it is the absolute minimum within the observation window, and ignoring the specimen point if the window contains at least one point of a lower amplitude;
shifting and positioning the window (block 192) on a further minimum point (if any) within the black region;
selecting the further specimen point (block 194) if it is the absolute minimum within the observation window, and ignoring the further specimen point if the window contains at least one point of a lower amplitude;
repeating the point selection and window shift steps for a number of consecutive minimum points along a continuous waveform portion S$_{RS}$ in the black region, and preserving the last selected minimum point, which is accepted and memorized (block 196).

The above operations therefore provide for selecting a single minimum point, typically the last detected minimum point, along continuous portion S$_{RS}$.

FIG. 8b shows more clearly the above analysis made of point P(x,y). As can be seen, the observation window F$_0$ centered on point P(x,y) contains a discretized signal Sd(t) waveform portion S$_{CD}$ located in black region R$_1$; and the specimen point P(x,y), being the absolute minimum of the local maximum and minimum points along portion S$_{CD}$, is therefore selected. Window F$_0$ is then shifted onto point P$_{mp}$, which, being the absolute minimum within window F$_0$, is also selected. Along the discretized signal Sd(t) waveform portion between points R and S in region R$_1$ (FIG. 8b), both points P(x,y) and P$_{mp}$ would therefore be preserved, by both being the absolute minimum within the respective observation windows. However, as the discretized signal Sd(t) waveform portion between R and S represents only one bar and must therefore comprise only one absolute minimum point, block 199 selects only one, in particular the last, of the absolute minimums determined by observation window F$_0$, in this case point P$_{mp}$. Other absolute minimum points may of course be selected, or a "mean" of the selected absolute minimum points, e.g. an arithmetic mean of the X axis values of the selected minimums, may be calculated.

The preserved absolute minimum point P$_{mp}$ is memorized in block 196.

Block 187, selected in the event point P(x,y) is located in grey region R$_2$, is followed by a block 187a, which provides for distinguishing the maximum points from the minimum points. More specifically, if the specimen point is a maximum, a block 201a is selected; if the specimen point is a minimum, a block 201b is selected.

More specifically, blocks 201a and 192 provide for:
selecting the specimen point P(x,y) (block 201a) if it is the absolute maximum within the observation window, and ignoring the specimen point if the window contains at least one point of a higher amplitude;
shifting and positioning the window (block 192) on a further specimen point located by block 183.

FIG. 8c shows observation window F$_0$ centered on the specimen point P(x,y) in grey region R$_2$ and containing a portion S$_{EF}$ of the discretized signal Sd(t) waveform. In the FIG. 8c situation, the specimen point P(x,y) is the absolute maximum of the points along portion S$_{EF}$, and is therefore selected as a maximum by block 201a and memorized by block 196.

Similarly, blocks 201b and 192 provide for:
selecting the specimen point P(x,y) (block 201b) if it is the absolute minimum within the observation window, and ignoring the specimen point if the window contains at least one point of a lower amplitude;
shifting and positioning the window (block 192) on a further specimen point located by block 183.

Blocks 201a and 201b are followed by block 196 for accepting and memorizing the preserved points.

Block 196 is followed by block 192 for selecting a further point.

When all the local maximum or minimum points have been analyzed (end of analysis: YES output of block 193), block 193 goes on to a block 202, which determines whether the sequence of points detected is consistent, i.e. that each minimum point is followed by a maximum point and vice versa. If it is, block 202 goes on to a block 203, by which the processed sequence is accepted and subsequently memorized (block 190). Conversely, block 202 goes on to a block 204, which repeats the above operations in an attempt to recover the lost maximum or minimum point or eliminate the extra ones.

If a maximum point is not followed by a minimum, or vice versa, two errors may be assumed:
first—a noise peak has been considered valid;
second—a valid maximum or minimum point has been eliminated.

The first is considered highly unlikely, and any correction of such an error is made by a follow-up stage (not shown) for eliminating any extra elements on the basis of information relative to the assumed symbol system of the code being examined. In the case of the second, a process (not shown) is applied to go over the minimum and maximum sequence in reverse and recover the minimum or maximum point eliminated by mistake, due to noise or poor sizing of the observation window.

Block 204 then goes back to block 202 to determine whether the further processed sequence of maximum and minimum points is now acceptable. If it is not, the above operations (starting again from block 181) may be repeated with a different width A of the observation window and/or with different threshold values T$_1$, T$_2$.

The absolute maximum and minimum points so determined represent the mid-points of the bar code spaces and bars respectively.

Figure 2F:
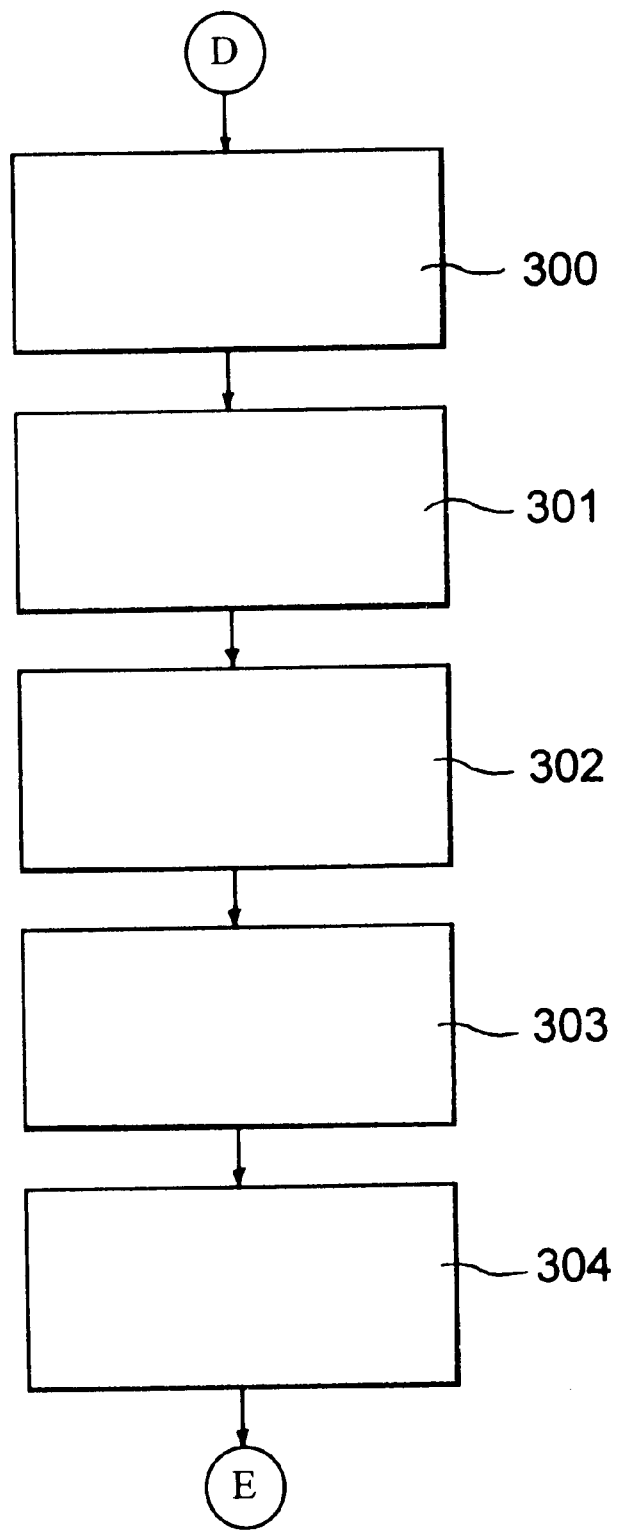

With reference to FIG. 2f, a more detailed description will now be given of the operations performed in block 200 to reposition the absolute maximum and minimum points, which is done to eliminate any inaccuracy in the position of the detected peak and valley points, due to noise in the discretized signal Sd(t) waveform.

To begin with, a block 300 determines, for each absolute maximum or minimum point P(x,y) being repositioned, the X$_{curr}$, Y$_{curr}$ coordinates of the point itself, and the X$_{prev}$, Y$_{prev}$ and X$_{next}$, Y$_{next}$ coordinates of the absolute maximum or minimum points before and after the point. The FIG. 9 embodiment relates to the repositioning of an absolute minimum point.

Block 300 is followed by a block 301, which calculates a threshold value H according to the equation:

$$H = \frac{ycurr + \max(yprev, ynext)}{2}$$

where $Y_{curr}$ is the Y axis value of the point P(x,y) being repositioned; $Y_{prev}$ and $Y_{next}$ are the Y axis values of the points before and after the point being repositioned; and the $\max(Y_{prev}, Y_{next})$ function extracts the greater of $Y_{prev}$ and $Y_{next}$.

Block 301 is followed by a block 302, which determines the points R and S at which curve portion $S_{PN}$, between points P and N before and after point P(x,y) being repositioned, intersects threshold H.

The X axis values corresponding to points R and S are then determined to define segment RS joining points R and S and parallel to the X axis, and the mid point M of segment RS is determined (block 303 downstream from block 302); and point P(x,y) is repositioned at point CR having the X axis value of point M and, as the Y axis value, the highest absolute value (i.e. minimum when repositioning a minimum point, and maximum when repositioning a maximum point) assumed by the signal in the region between points R and S (block 304 downstream from block 303).

Figure 9:
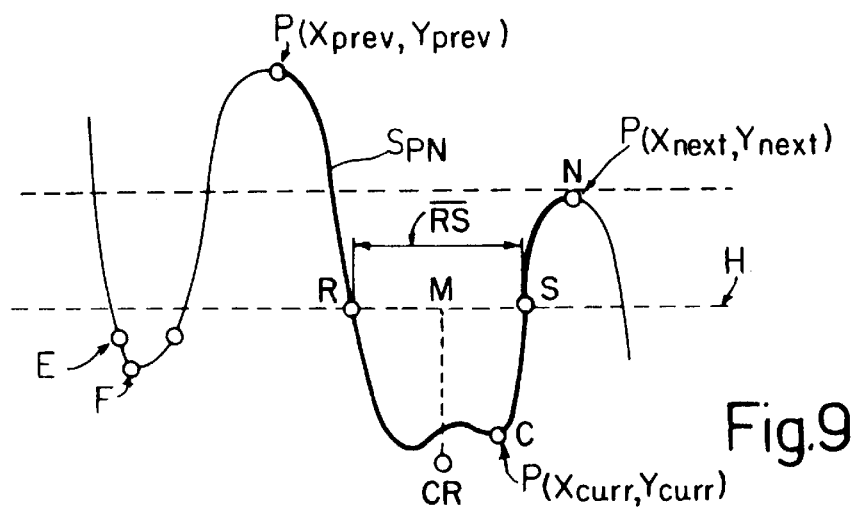
FIG. 9 shows a final step in the method according to the present invention.

As shown in FIG. 9, the repositioned point may not be physically present in the sampled signal.

The above method lends itself to numerous variations. A first preferred variation is to define points R and S as the points at which the signal crosses line $Y=T_1$. Though simpler, such a variation fails to provide for accurately repositioning the peak in the event the signal segment below $T_1$ comprises only a small number of points, as between points E and F in FIG. 9. A second preferred variation is to define points R and S as the maximum-derivative points of the wavefronts to the right and left of the point P(x,y) being repositioned. Maximum points of a value above $T_2$ are repositioned in exactly the same way.

The maximum and minimum points in grey region $R_2$ are only repositioned using the above method if the number of discretized samples in the signal segment between points R and S is above a given minimum number ensuring sufficiently accurate measurements, and which is currently set at 5, but could be a programmable parameter. At any rate, the positioning accuracy of the points in grey region $R_2$ is not a critical factor. The above method therefore provides for greatly reducing the positioning error of the peaks and valleys, and so reducing the margin of error in the course of subsequent processing of the signal.

By dividing the observation space of the discretized signal waveform into three regions, each assigned a set of rules (FIG. 2e) implemented in conjunction with the observation window, the method described for estimating the mid-points of bar code elements therefore provides for accurately selecting and eliminating redundant maximum and minimum points, and so extracting the mid-points of the bar code elements even in the presence of noise and a high degree of blurring.

What is claimed is:

1. A method of estimating the mid-points of elements of a bar code, wherein said code is illuminated (17), and the light (R) diffused by said code (8) is picked up (20) to generate in response a signal (S(t)) having a substantially alternating discretized waveform profile comprising high-amplitude zones alternating with low-amplitude zones; each high-amplitude zone corresponding to a space of the code (8), and each low-amplitude zone corresponding to a bar of the code (8);

said discretized waveform (Sd(t)) having a number of local maximum and minimum points, the method comprising the steps of:

defining (181) an observation window ($F_0$) of a given width (A), by which to observe said discretized waveform; and positioning (195) said observation window ($F_0$) on said local maximum and minimum points of said discretized waveform to eliminate redundant maximum and minimum points.

2. A method as claimed in claim 1, characterized by also comprising the steps of:

defining (140) threshold values ($T_1$, $T_2$) and applying said threshold values ($T_1$, $T_2$) to said discretized waveform (Sd(t)) to divide (150) the space in which the waveform lies into a number of regions ($R_1$, $R_2$, $R_3$); and assigning each of said regions ($R_1$, $R_2$, $R_3$) a set of specific rules by which to eliminate said redundant points.

3. A method as claimed in claim 2, characterized in that said step of defining threshold values (140) comprises the step of defining a first and a second threshold ($T_1$, $T_2$); said dividing step (150) comprising the step of dividing the space in which the waveform lies into three regions ($R_1$, $R_2$, $R_3$):

a first black region ($R_1$) comprising discretized waveform (Sd(t)) values ranging between a minimum value (0) and said first threshold ($T_1$);

a second grey region ($R_2$) comprising discretized waveform (Sd(t)) values ranging between said first threshold ($T_1$) and said second threshold ($T_2$); and a third white region ($R_3$) comprising discretized waveform (Sd(t)) values above said second threshold ($T_2$).

4. A method as claimed in claim 3, characterized by comprising the substep of positioning (182) the observation window ($F_0$) on a specimen maximum or minimum point (P(x,y)) and comparing said specimen point with all the other discretized waveform (Sd(t)) points within the observation window ($F_0$).

5. A method as claimed in claim 4, characterized by also comprising the substeps of:

determining (188, 197) whether the specimen point (P(x, y)) within said observation window ($F_0$) is located in the black region ($R_1$) and is a maximum point; and eliminating (198) said specimen point in the event the outcome of said determining step is positive.

6. A method as claimed in claim 4, characterized by comprising the substeps of:

determining (186, 189) whether the specimen point (P(x, y)) within said observation window is located in the white region ($R_3$) and is a minimum point; and eliminating (191) said specimen point in the event the outcome of said determining step is positive.

7. A method as claimed in claim 6, characterized by performing the following steps in the event the specimen point (P(x,y)) is located in the white region ($R_3$) and is acknowledged as a maximum point:

selecting said specimen point if it is the absolute maximum within said observation window, and ignoring said specimen point if said observation window contains at least one point of a higher amplitude;

shifting and positioning said observation window on a further maximum point, if any, in the white region;

selecting said further specimen point if it is the absolute maximum within said observation window, and ignoring said further specimen point if said observation window contains at least one point of a higher amplitude; and repeating said selecting and window shifting steps for a number of maximum points along a continuous portion of said waveform in said white region, and preserving one absolute maximum point of the maximum points selected.

8. A method as claimed in claim 5, characterized by performing the following steps in the event the specimen point (P(x,y)) is located in the black region (R₁) and is acknowledged as a minimum point:

selecting said specimen point if it is the absolute minimum within said observation window, and ignoring said specimen point if said observation window contains at least one point of a lower amplitude;

shifting and positioning said observation window on a further minimum point, if any, in the black region;

selecting said further specimen point if it is the absolute minimum within said observation window, and ignoring said further specimen point if said observation window contains at least one point of a lower amplitude; and repeating said selecting and window shifting steps for a number of maximum points along a continuous portion of said waveform in said black region, and preserving one absolute minimum point of the minimum points selected.

9. A method as claimed in claim 4, characterized by performing the following steps in the event the specimen point (P(x,y)) is located in the grey region (R₂) and is acknowledged as a maximum point:

selecting said specimen point if it is the absolute maximum within said observation window, and ignoring said specimen point if said observation window contains at least one point of a higher amplitude; and shifting and positioning said observation window on a further specimen point.

10. A method as claimed in claim 4, characterized by performing the following steps in the event the specimen point (P(x,y)) is located in the grey region (R₂) and is acknowledged as a minimum point:

selecting said specimen point if it is the absolute minimum within said observation window, and ignoring said specimen point if said observation window contains at least one point of a lower amplitude; and shifting and positioning said observation window on a further specimen point.

11. A method as claimed in claim 4, characterized in that said substep of positioning (182) the observation window (F₀) on a maximum or minimum point comprises the step of so positioning the observation window that an axis of symmetry of the observation window extends through the specimen point (P(x,y)).

12. A method as claimed in claim 3, characterized in that said step of defining a first and a second threshold (T₁, T₂) comprises the step of assigning each threshold (T₁, T₂) a previously processed fixed numeric value.

13. A method as claimed in claim 12, characterized in that said step of defining a first and a second threshold (T₁, T₂) comprises the step of assigning said first threshold (T₁) a first numeric value substantially equal to 33% of the maximum value of the discretized waveform (Sd(t)), and said second threshold a second numeric value substantially equal to 66% of the maximum value of the discretized waveform (Sd(t)).

14. A method as claimed in claim 3, characterized in that said step of defining a first and a second threshold (T₁, T₂) comprises the step of assigning each threshold (T₁, T₂) a numeric value as a function of characteristic parameters of said signal.

15. A method as claimed in claim 14, characterized in that said characteristic parameters comprise the mean value of said signal.

16. A method as claimed in claim 14, characterized in that said characteristic parameters comprise the mean of the limit values of said signal.

17. A method as claimed in claim 14, characterized in that said step of defining a first and a second threshold (T₁, T₂) comprises the step of:

dividing (141) the discretized waveform (Sd(t)) into a predetermined number of adjacent regions;

calculating (142), for each defined region (141), the mean value and the mean of the limit values of the signal within said region;

enabling (143) a first threshold calculating mode (144, 146) in the event the mean value remains substantially constant for the various regions, and enabling a second threshold calculating mode (145, 146) in the event the mean of the limit values remains substantially constant for the various regions.

18. A method as claimed in claim 17, characterized in that, in the first threshold calculating mode (144, 146), said first threshold T₁ and said second threshold T₂ are calculated according to the equations;

$$T_1 = m - H$$

$$T_2 = m + K$$

where H and K are two constants, and m represents the mean value.

19. A method as claimed in claim 17, characterized in that, in the second threshold calculating mode (145, 146), said first threshold T₁ and said second threshold T₂ are calculated according to the equations;

$$T_1 = m - H$$

$$T_2 = m + K$$

where H and K are two constants, and m represents the mean of the limit values.

20. A method as claimed in claim 1, characterized by comprising the step of analyzing the discretized waveform (Sd(t)) to calculate a term (W) representing the width of the narrowest element of said bar code.

21. A method as claimed in claim 20, characterized in that said step of defining (181) said observation window (F₀) comprises defining an observation area containing a subportion of said discretized waveform; said observation area having at least one characteristic dimension (A) correlated to, in particular equal to or greater than, the width (W) of said narrowest element.

22. A method as claimed in claim 21, characterized in that the value of said characteristic dimension (A) ranges between the width of the narrowest element and twice the width of the narrowest element.

23. A method as claimed in claim 3, characterized in that the step (160) of analyzing the waveform to define the narrowest element (W) comprises the substeps of:

selecting (161) from the discretized waveform (Sd(t)) only the high-amplitude zones of a value above the second threshold (T₂), and only the low-amplitude zones of a value below the first threshold (T₁), to obtain a subset of peaks and valleys;

selecting (162) from said subset of peaks and valleys the peak-valley pair separated by the smallest distance (D_{min1}), to extract a first distance (D_{min1}) between corresponding elements;

determining (163) half the minimum distance ($D_{min2}/2$) between two adjacent high-amplitude zones, both located in the third white region ($R_3$); said half the minimum distance ($D_{min2}/2$) representing a second distance ($D_{min2}/2$) between corresponding elements;

determining (164) half the minimum distance ($D_{min3}/2$) between two adjacent low-amplitude zones, both located in the first black region ($R_1$); said half the minimum distance ($D_{min3}/2$) representing a third distance ($D_{min3}/2$) between corresponding elements;

extracting (165) the smallest value of said first, second and third distances ($D_{min1}$, $D_{min2}/2$, $D_{min3}/2$) between corresponding elements, and electing said smallest value as the dimension (W) of the narrowest element of the code.

24. A method as claimed in claim 1, characterized by comprising a repositioning step (200) for repositioning the maximum and minimum points preserved following said step of eliminating said redundant points, to recalculate the position of each preserved point along said waveform.

25. A method as claimed in claim 24, characterized in that said repositioning step (200) comprises the steps of:

determining (300), for each absolute maximum or minimum point (P(x,y)) being repositioned, the coordinates ($X_{curr}$, $Y_{curr}$) of said point (P(x,y)) and the coordinates ($X_{prev}$, $Y_{prev}$; $X_{next}$, $Y_{next}$) of the maximum or minimum points before and after said point (P(x,y)) being repositioned;

calculating (300) a threshold value (H) by means of a linear combination of said coordinates;

determining (302) the points of intersection (R, S) at which the curve portion ($S_{PN}$) of said discretized waveform extending between the maximum or minimum point before and after the point being repositioned intersects said threshold (H);

calculating (302) the segment (RS) joining said points of intersection (R, S), and calculating the coordinates of the mid point (M) of said segment (RS); and assigning (304) to the point being repositioned a coordinate of the mid point (M) and the highest absolute value assumed by said discretized waveform in the region between the points of intersection (R, S).

26. A method as claimed in claim 25, characterized in that said step of calculating (300) a threshold value (H) by means of a linear combination of said coordinates comprises the step of calculating a threshold value H according to the equation:

$$H = \frac{ycurr + \max(yprev, ynext)}{2}$$

where $Y_{curr}$ is the Y axis value of the point (P(x,y)) being repositioned; $Y_{prev}$ and $Y_{next}$ are the Y axis values of the maximum or minimum point before and after the point being repositioned; and the $\max(Y_{prev}, Y_{next})$ function extracts the greater of $Y_{prev}$ and $Y_{next}$.

27. A method as claimed in claim 1, comprising the step of sampling (110) an analog signal generated in response of said light (R) diffused by said code (8) to obtain said discretized waveform (Sd(t)).

* * * * *